US011180205B2

(12) United States Patent
Amino et al.

(10) Patent No.: US 11,180,205 B2
(45) Date of Patent: Nov. 23, 2021

(54) HUMANOID ROBOT

(71) Applicant: Hitachi, Ltd., Tokyo (JP)

(72) Inventors: Azusa Amino, Tokyo (JP); Ryoko Ichinose, Tokyo (JP); Ryosuke Nakamura, Tokyo (JP); Akihiro Yamamoto, Tokyo (JP)

(73) Assignee: HITACHI, LTD., Tokyo (JP)

(*) Notice: Subject to any disclaimer, the term of this patent is extended or adjusted under 35 U.S.C. 154(b) by 603 days.

(21) Appl. No.: 16/087,669

(22) PCT Filed: Mar. 8, 2017

(86) PCT No.: PCT/JP2017/009174
§ 371 (c)(1),
(2) Date: Sep. 24, 2018

(87) PCT Pub. No.: WO2017/175532
PCT Pub. Date: Oct. 12, 2017

(65) Prior Publication Data
US 2019/0100263 A1 Apr. 4, 2019

(30) Foreign Application Priority Data

Apr. 5, 2016 (JP) .............................. JP2016-075745

(51) Int. Cl.
*B62D 57/028* (2006.01)
*B25J 5/00* (2006.01)
(Continued)

(52) U.S. Cl.
CPC .............. *B62D 57/028* (2013.01); *B25J 5/00* (2013.01); *B25J 5/007* (2013.01); *B25J 13/089* (2013.01);
(Continued)

(58) Field of Classification Search
CPC . B62D 57/028; B25J 5/00; B25J 5/007; B25J 13/089; B25J 18/00; B25J 19/008; B25J 19/0091; B25J 19/02
See application file for complete search history.

(56) References Cited

U.S. PATENT DOCUMENTS 7,278,501 B2 * 10/2007 Mori ...................... B25J 9/1641
180/8.5
7,658,245 B2 * 2/2010 Nakamura ........... B62D 57/028
180/8.3
(Continued)

FOREIGN PATENT DOCUMENTS

| CN | 101428655 | * | 5/2009 |
| CN | 101428655 A | | 5/2009 |

(Continued)

OTHER PUBLICATIONS

English translation of JPH0731749 (Year: 1995).*
(Continued)

*Primary Examiner* — Minnah L Seoh
*Assistant Examiner* — Harold Eric Pahlck, III
(74) *Attorney, Agent, or Firm* — Mattingly & Malur, PC

(57) ABSTRACT

A humanoid robot includes: a body portion; a head portion; a left arm and a right arm that have ends connected to the left and right at an upper portion of the body portion; a left foot and a right foot that have ends connected to the left and right at a lower portion of the body portion; and a left running unit and a right running unit provided to the other ends of the left foot and the right foot. The left running unit has a left drive wheel on a front side of an advancing direction and a left follower wheel on a rear side in the advancing direction, the right running unit has a right drive wheel on a front side of the advancing direction, and a right follower wheel on a rear side in the advancing direction.

8 Claims, 15 Drawing Sheets

(51) Int. Cl.
    *B25J 13/08*    (2006.01)
    *B25J 18/00*    (2006.01)
    *B25J 19/00*    (2006.01)
    *B25J 19/02*    (2006.01)

(52) U.S. Cl.
    CPC ........... *B25J 18/00* (2013.01); *B25J 19/0008* (2013.01); *B25J 19/0091* (2013.01); *B25J 19/02* (2013.01)

(56) References Cited

U.S. PATENT DOCUMENTS

| | | | |
|---|---|---|---|
| 2004/0060746 | A1 | 4/2004 | Furuta et al. |
| 2009/0114460 | A1 | 5/2009 | Amino et al. |
| 2011/0054681 | A1 | 3/2011 | Amino et al. |
| 2016/0151909 | A1* | 6/2016 | Hardouin ............... B25J 9/08 700/245 |
| 2019/0240832 | A1* | 8/2019 | Kawaguchi ............ F16H 21/46 |

FOREIGN PATENT DOCUMENTS

| | | |
|---|---|---|
| CN | 205097196 U | 3/2016 |
| JP | 59-38991 U | 3/1984 |
| JP | 05-285864 A | 11/1993 |
| JP | 07-031749 A | 2/1995 |
| JP | H0731749 * | 2/1995 |
| JP | 2001-157972 A | 6/2001 |
| JP | 2003-181153 A | 7/2003 |
| JP | 2003-210857 A | 7/2003 |
| JP | 2004-034169 A | 2/2004 |
| JP | 2006-116679 A | 5/2006 |
| JP | 2007-50490 A | 3/2007 |
| JP | 2011-045973 A | 3/2011 |
| KR | 10-2010-0028255 A | 3/2010 |
| TW | 544380 B | 8/2003 |

OTHER PUBLICATIONS

Extended European Search Report received in corresponding European Application No. 17778911.2 dated Nov. 7, 2019.
Chinese Office Action received in corresponding Chinese Application No. 201780020738.6 dated Feb. 7, 2021.
Japanese Office Action received in corresponding Japanese Application No. 2018-510278 dated Jul. 9, 2019.
International Search Report of PCT/JP2017/009174 dated May 9, 2017.

* cited by examiner

HUMANOID ROBOT

TECHNICAL FIELD

The present invention relates to a humanoid robot.

BACKGROUND ART

As a humanoid robot, a technique described in Patent document 1 is known, for example. Patent document 1 discloses a humanoid robot provided with wheels attached to leading ends of leg portions so as to be able to be driven, suspensions consisting of springs and dumpers attached in parallel between the wheels and a body, and actuators attached between the suspensions and the body. Then, the humanoid robot described has a control apparatus that is connected in series with the suspensions and the actuators, detects a rake and an angular velocity relative to the direction of gravity of the robot with an inclinometer mounted onto the body of the humanoid robot, and controls the actuators based on the detected rake and angular velocity such that they agree with a target angle and a target angular velocity of the humanoid robot.

CITATION LIST

Patent Document

Patent document 1 Japanese Patent Application Laid-Open No. 2011-45973

SUMMARY OF THE INVENTION

Technical Problem

However, in Patent document 1, measures to be taken at the time of occurrence of power shutdown, centrifugal forces or external forces exceeding control limits, or the like are not considered at all. Accordingly, at the time of occurrence of power shutdown, centrifugal forces or external forces exceeding control limits, or the like, the robot might fall, and it might become impossible to maintain its operation.

In view of this, the present invention provides a humanoid robot with lowered possibility of falling at the time of occurrence of power shutdown, centrifugal forces or external forces, or the like and high operation continuation probability.

Solution to Problem

In order to solve the abovementioned problem, a humanoid robot of the present invention is characterized by being provided with: a body portion; a head portion provided to an upper portion of the body portion; a left arm and a right arm that have ends connected to the left and right at an upper portion of the body portion; a left foot and a right foot that have ends connected to the left and right at a lower portion of the body portion; and a left running unit and a right running unit provided to the other ends of the left foot and the right foot, wherein the left running unit has a left drive wheel on a front side of an advancing direction and a left follower wheel on a rear side in the advancing direction that can passively change an advancing direction, the right running unit has a right drive wheel on a front side of the advancing direction, and a right follower wheel on a rear side in the advancing direction that can passively change an advancing direction, and the left drive wheel, the right drive wheel, the left follower wheel, and the right follower wheel travel while being in contact with a ground.

Advantageous Effects of the Invention

According to the present invention, it is possible to provide a humanoid robot with lowered possibility of falling at the time of occurrence of power shutdown, centrifugal forces or external forces, or the like and high operation continuation probability.

Problems, configurations and effects other than those mentioned above are made apparent by the following explanations of embodiments.

DESCRIPTION OF EMBODIMENTS

Hereinafter, an embodiment of the present invention is explained using the figures.

Embodiment 1

Figure 1:
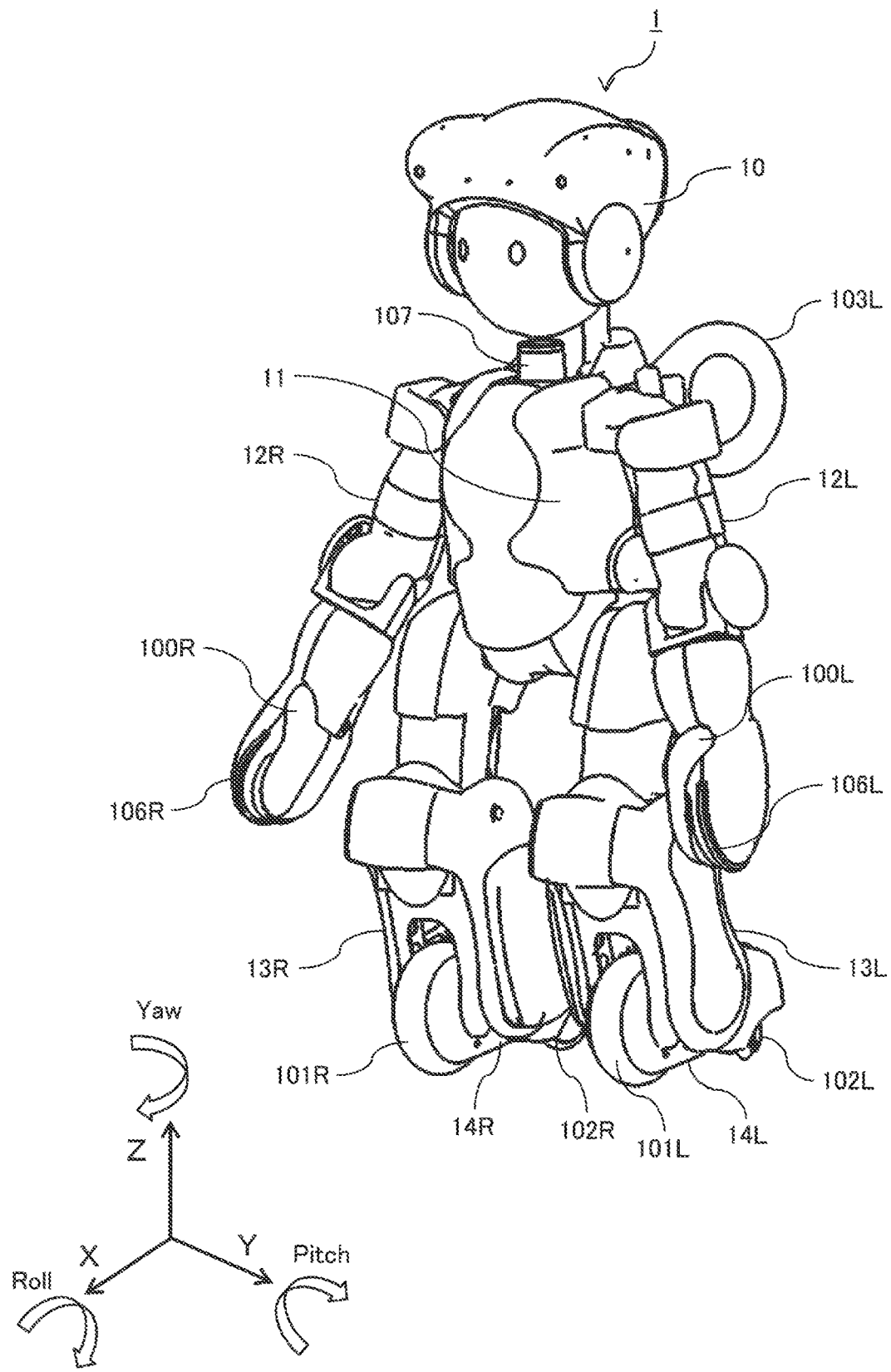
FIG. 1 is a front perspective view of a humanoid robot of Embodiment 1 according to one example of the present invention.
Figure 2:
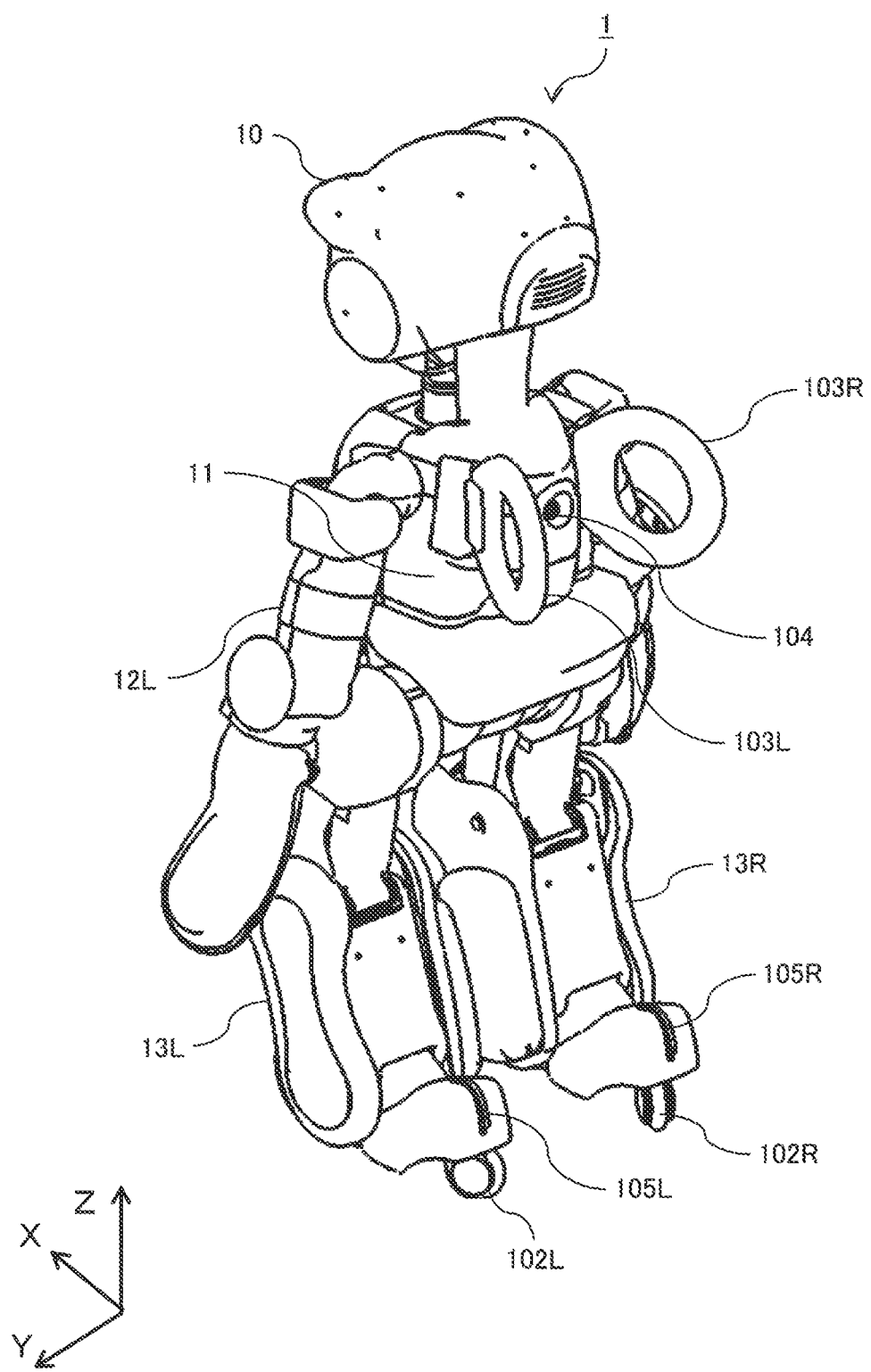
FIG. 2 is a rear perspective view of the humanoid robot of Embodiment 1.

FIG. 1 is a front perspective view of a humanoid robot of Embodiment 1 according to one example of the present invention, and FIG. 2 is a rear perspective view of the humanoid robot of Embodiment 1. Note that in the following explanation, the advancing direction of the humanoid robot 1 is assumed to be an X-axis, the direction of gravity is assumed to be a Z-axis, and the lateral direction is assumed to be a Y-axis. In addition, rotation about the X-axis is defined as roll (Roll), rotation about the Y-axis is defined as pitch (Pitch), and rotation about the Z-axis is defined as yaw (Yaw).

As shown in FIG. 1, the humanoid robot 1 is constituted by: a head portion 10; a body portion 11; a left arm 12L and a right arm 12R provided to the left and right at an upper portion, in the direction of gravity, of the body portion 11; a left foot 13L and a right foot 13R provided to the left and right at a lower portion, in the direction of gravity, of the body portion 11; a left running unit 14L provided to a lower end portion, in the direction of gravity, of the left foot 13L; and a right running unit 14R provided to a lower portion, in the direction of gravity, of the right foot 13R. The head portion 10 is equipped with sensors such as a camera or microphone. Although not illustrated, the inside of the body portion 11 is equipped with a control unit and a position-measuring sensor that control whole-body movement of the humanoid robot 1. For example, a gyro sensor is used as the sensor, and measures an angle and an angular velocity relative to the direction of gravity.

Before an upper portion constituting the body portion 11 and corresponding to a neck connecting the head portion 10 and the body portion 11, an ambient environment measurement sensor 107 is mounted, and the ambient environment measurement sensor 107 measures distances to objects surrounding it. In addition, as shown in FIG. 2, to the left and right at an upper portion of the back of the body portion 11, a left hanger ring 103L and a right hanger ring 103R formed into ring-like forms are provided. These left hanger ring 103L and right hanger ring 103R are used for example as handles when the humanoid robot 1 is carried, and in addition, are used for hanging the humanoid robot 1 on a maintenance hanger at the time of maintenance of it. Furthermore, the left hanger ring 103L and right hanger ring 103R for example reduce an impact applied to the humanoid robot 1 when it fell toward the back side. The left hanger ring 103L and right hanger ring 103R desirably are constituted by a soft material to reduce such impacts.

Unillustrated springs are installed at portions where the left hanger ring 103L and right hanger ring 103R are attached to the body portion 11 to thereby make the left hanger ring 103L and right hanger ring 103R bend more flexibly, making it possible to further reduce impacts. The back of the body portion 11 is equipped with a rear-view camera 104 between the left hanger ring 103L and the right hanger ring 103R. The rear-view camera 104 is for example used for viewing backward when the humanoid robot 1 guides human. The left hanger ring 103L and right hanger ring 103R are attached at angles not to inhibit the field of view of the rear-view camera 104.

As shown in FIG. 1, the left arm 12L and right arm 12R are connected to the left and right ends at an upper portion, in the direction of gravity, of the body portion 11 of the humanoid robot 1, respectively, and the left arm 12L and right arm 12R are provided for example with a left gripper 100L and a right gripper 100R for gripping objects at their respective leading end portions. In addition, leading end portions of the left arm 12L and right arm 12R are provided with a left hand-end wheel 106L and a right hand-end wheel 106R, which can reduce frictions for example when the humanoid robot 1 makes relative motions with its hand-ends in contact with the ground, and are particularly effective at the time of movement of transitioning from a state where it is lying face-up to the upright position, as mentioned below. By providing the left gripper 100L and the right gripper 100R with the left hand-end wheel 106L and the right hand-end wheel 106R, respectively, it is possible to attain both the gripping functionality and smooth movement of transitioning from the state where it is lying face-up to the upright position.

Lower leading end portions of the left foot 13L and right foot 13R are provided with a left running unit 14L and a right running unit 14R, with suspensions to move in the up-down direction being interposed therebetween. The left running unit 14L and the right running unit 14R are provided with a left drive wheel 101L and a right drive wheel 101R, respectively, at their front portions in the advancing direction of the humanoid robot 1, and in addition, are provided with a left follower wheel 102L and a right follower wheel 102R, respectively, at their rear portions. For example, offset casters or the like are used for the left follower wheel 102L and right follower wheel 102R, and the left follower wheel 102L and right follower wheel 102R move not to inhibit motions of the left drive wheel 101L and right drive wheel 101R. The configuration in which the left foot 13L and right foot 13R are connected to the body portion 11 allows reduction of the footprint and smaller turning circles, running with the left drive wheel 101L and right drive wheel 101R enables agile travelling, and because the left follower wheel 102L and right follower wheel 102R are provided, the possibility of falling at the time of occurrence of power shutdown or unexpected disturbance can be lowered, thereby realizing the humanoid robot 1 with high operation continuation probability.

As shown in FIG. 2, rear upper end portions of the left running unit 14L and right running unit 14R are provided with a left slide pad 105L and a right slide pad 105R, respectively. The left slide pad 105L and right slide pad 105R are constituted by a material with a low coefficient of friction, and for example if the humanoid robot 1 fell face-up, reduces frictional resistance that it receives from the ground when it makes motions while being in contact with the ground.

Figure 3:
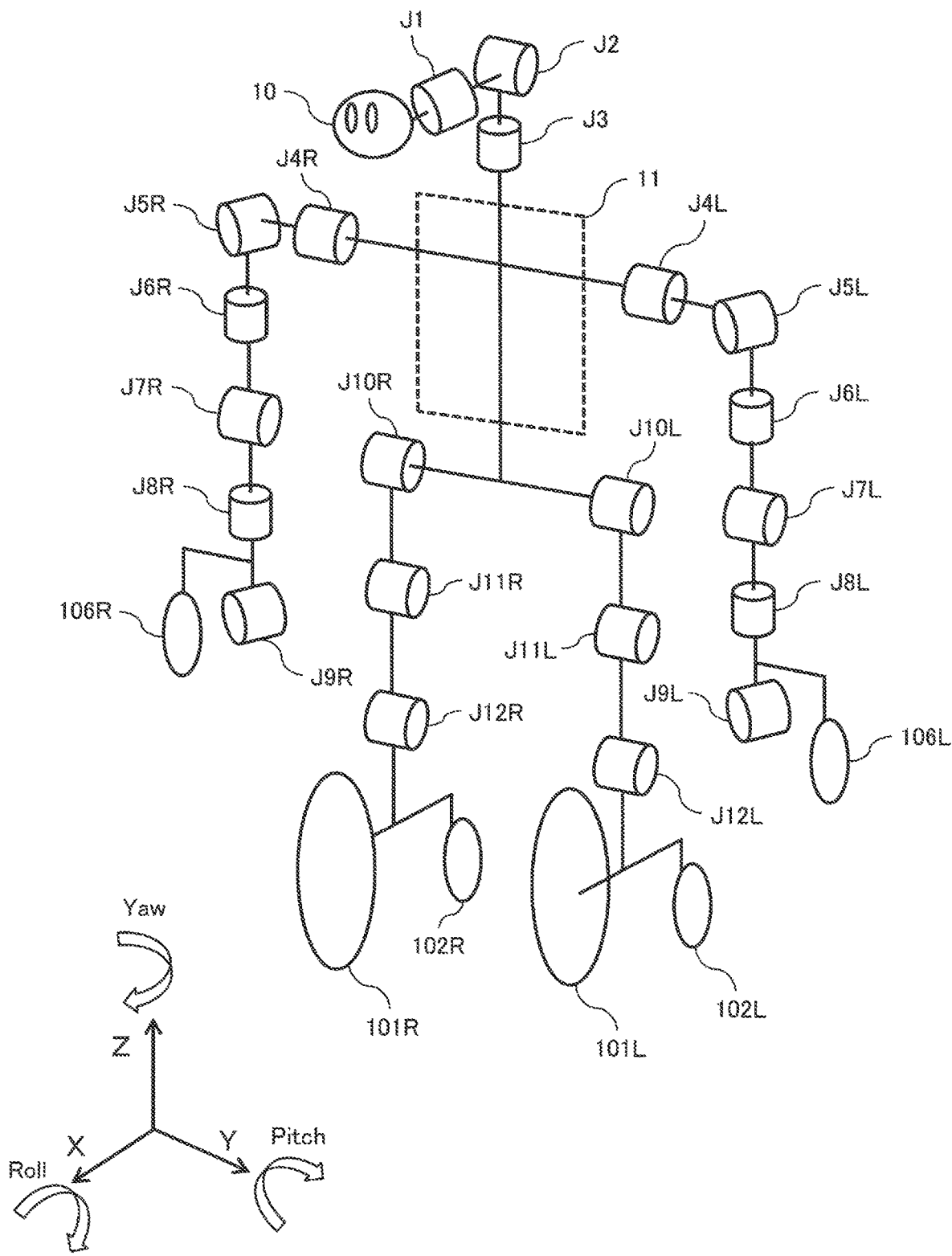
FIG. 3 is a schematic diagram showing the joint degrees of freedom of the humanoid robot of Embodiment 1.

FIG. 3 is a schematic diagram showing the joint degrees of freedom of the humanoid robot 1. As shown in FIG. 3, the head portion 10 are provided with three degrees of freedom, which are a head portion roll axis J1, a head portion pitch axis J2 and a head portion yaw axis J3. The left and right arms 12L, 12R are connected to left and right end portions at an upper portion, in the direction of gravity, of the body portion 11, and consists of, starting from their roots, a left shoulder pitch axis J4L, a right shoulder pitch axis J4R, a left shoulder roll axis J5L, a right shoulder roll axis J5R, a left upper arm yaw axis J6L, a right upper arm yaw axis J6R, a left elbow pitch axis J7L, a right elbow pitch axis J7R, a left wrist yaw axis J8L and a right wrist yaw axis J8R, respectively, and at their still farther ends, are provided with a left gripper axis J9L, a right gripper axis J9R, a left hand-end wheel 106L and a right hand-end wheel 106R, respectively.

In addition, to left and right end portions at a lower portion, in the direction of gravity, of the body portion 11 are connected the left foot 13L and the right foot 13R, which are constituted by a left hip joint pitch axis J10L, a right hip joint pitch axis J10R, a left knee pitch axis J11L, a right knee pitch axis J11R, a left ankle pitch axis J12L and a right ankle pitch axis J12R, respectively, and the left foot 13L and right foot 13R are each provided with three pitch degrees of freedom. End portions opposite to portions where the left foot 13L and right foot 13R are connected to the body portion 11 are provided with the left running unit 14L and right running unit 14R (FIG. 1). The humanoid robot 1 of the present embodiment is configured to have the abovementioned degrees of freedom, travels on the ground by driving the left drive wheel 101L and right drive wheel 101R, and accelerates or decelerates or shifts its centroid leftward and rightward by appropriately moving any of the joints with the abovementioned degrees of freedom.

Figure 4:
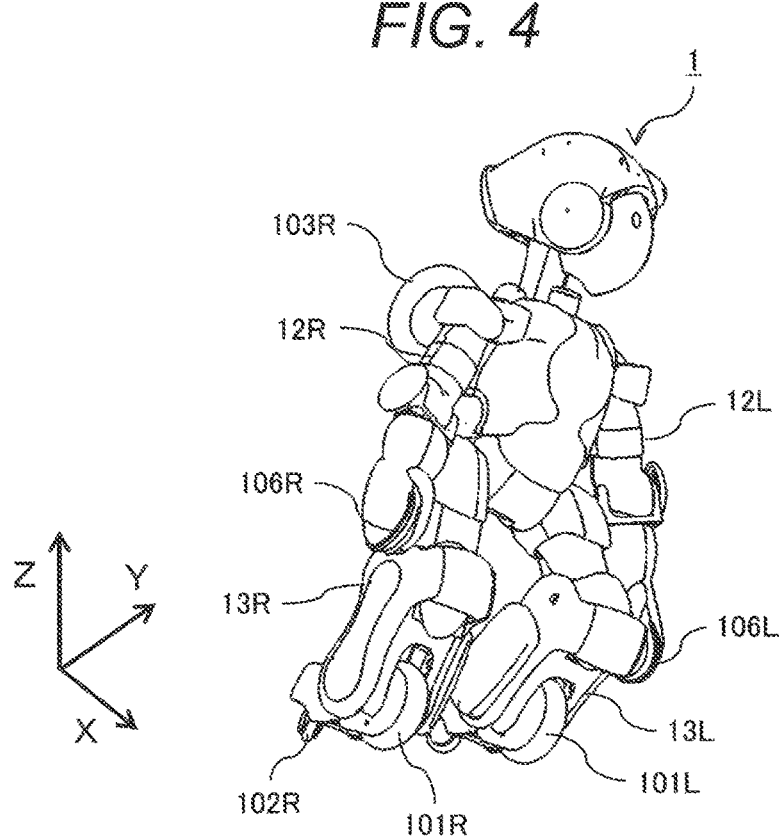
FIG. 4 is a perspective view showing how it appears when the humanoid robot of Embodiment 1 revolve-runs leftward.
Figure 5:
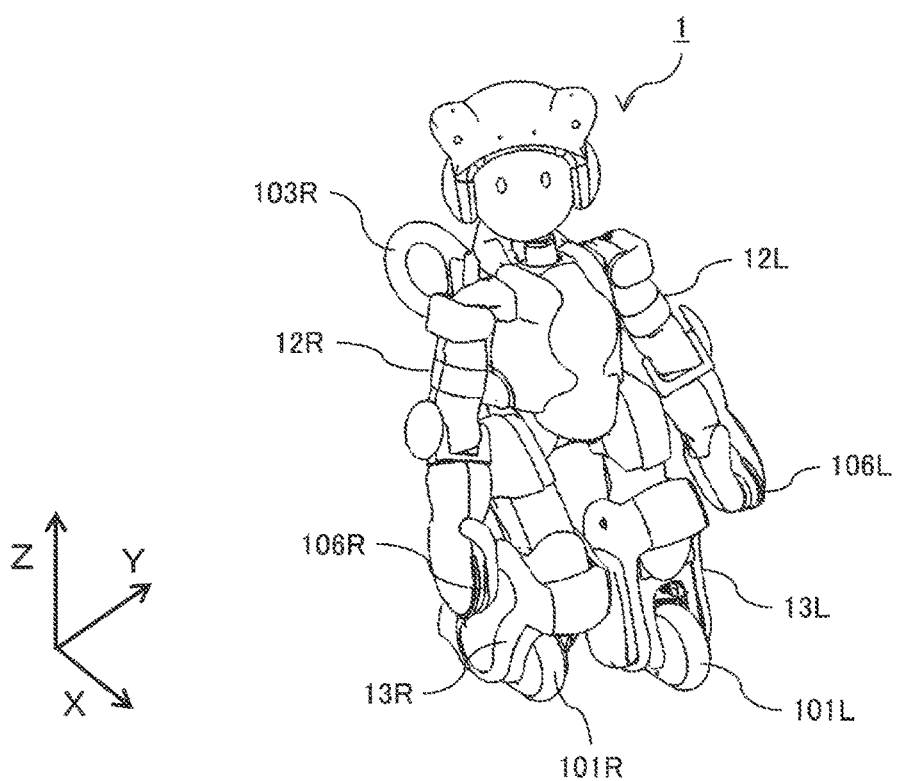
FIG. 5 is a perspective view showing how it appears when the humanoid robot of Embodiment 1 revolve-runs rightward.

FIG. 4 is a perspective view showing how it appears when the humanoid robot 1 revolve-runs leftward, and FIG. 5 is a perspective view showing how it appears when the humanoid robot revolve-runs rightward. When revolve-running leftward or rightward, a centrifugal force due to a revolving radius and a running speed is generated, and if the humanoid robot 1 runs in the upright position, the range of stability decreases. In view of this, as shown in FIG. 4, when revolve-running leftward, the abovementioned individual joints are appropriately controlled so as to make the length of the left foot 13L in the Z-direction shorter than the right foot 13R to thereby tilt the entire humanoid robot 1 leftward, and displace the centroid leftward from the upright position. Thereby, the range of stability increases, and the possibility of falling at the time of occurrence of accidental disturbance can be lowered.

In addition, as shown in FIG. 5, when revolve-running rightward, the abovementioned individual joints are appropriately controlled so as to make the length of the right foot 13R in the Z-direction shorter than the left foot 13L to thereby tilt the entire humanoid robot 1 rightward, and displace the centroid rightward from the upright position. Thereby, the range of stability increases, and the possibility of falling at the time of occurrence of accidental disturbance can be lowered.

Figure 6:
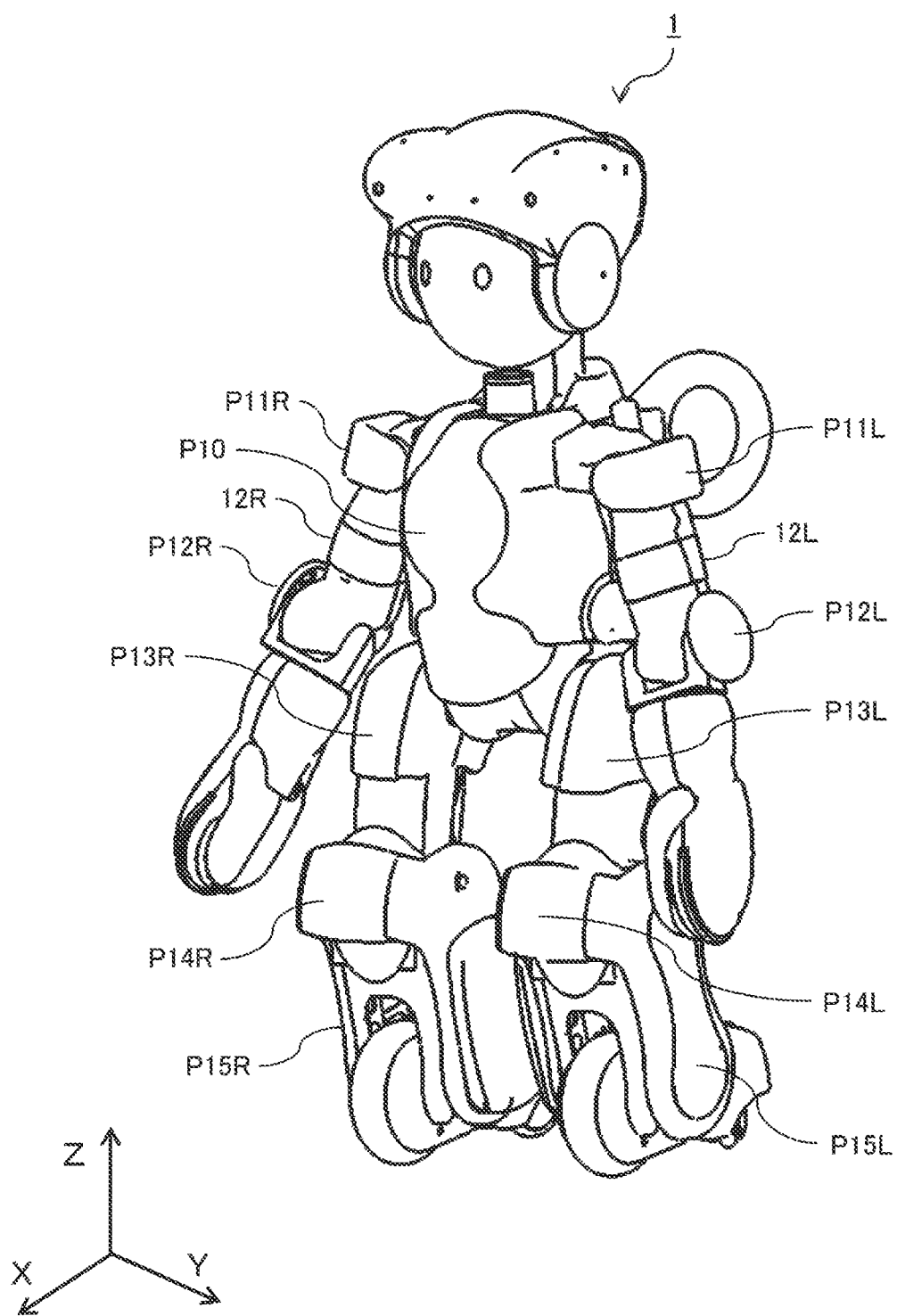
FIG. 6 is a front perspective view showing positions of protectors fit to the humanoid robot of Embodiment 1.
Figure 7:
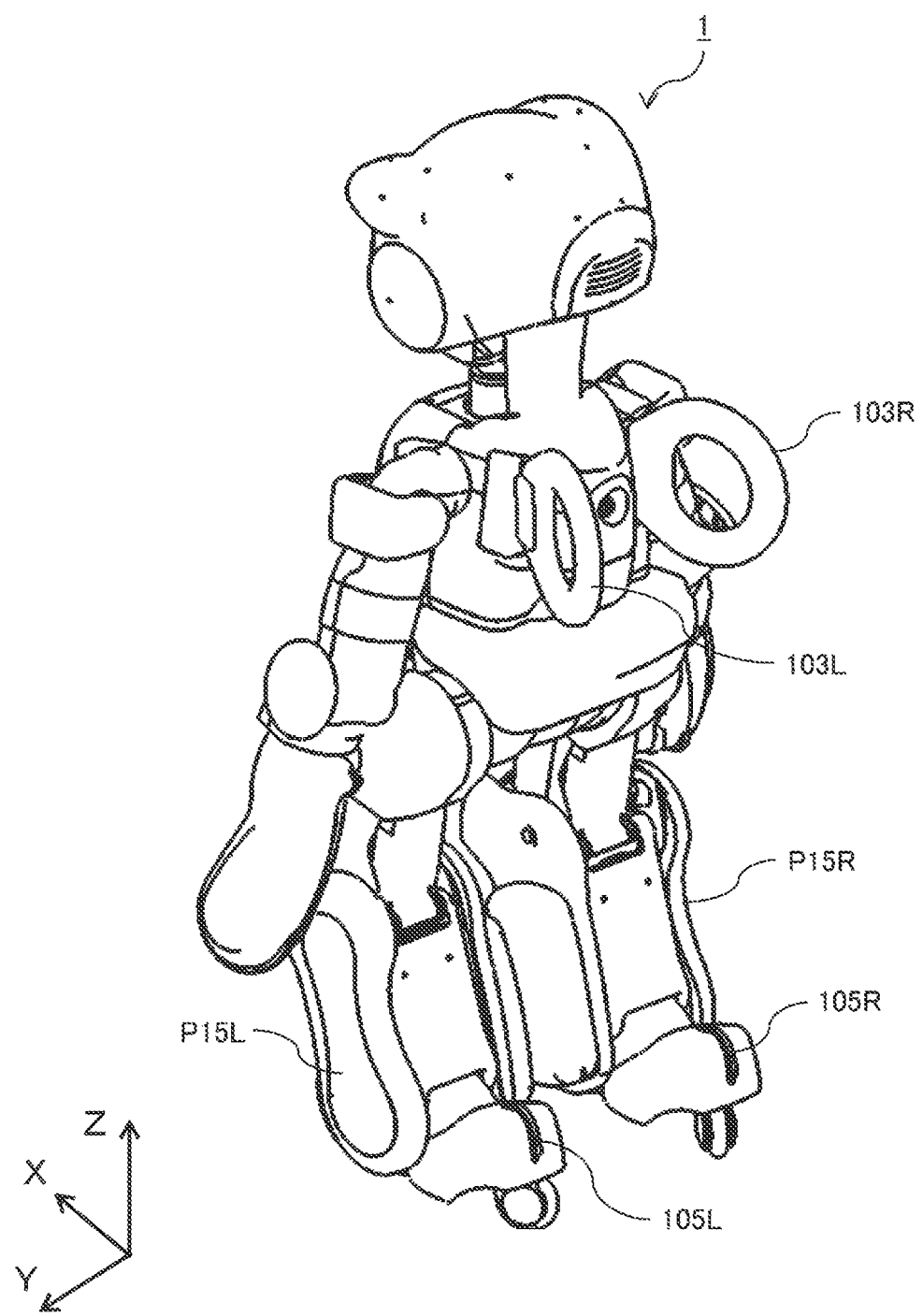
FIG. 7 is a rear perspective view showing positions of protectors fit to the humanoid robot of Embodiment 1.

FIG. 6 is a front perspective view showing positions of protectors fit to the humanoid robot 1, and FIG. 7 is a rear perspective view showing positions of protectors fit to the humanoid robot 1. The protectors fit to the humanoid robot 1 reduce impacts caused by contacts with the ground if the humanoid robot 1 fell.

As shown in FIG. 6, if the humanoid robot 1 fell forward, a trunk protector P10 and a left knee protector P14L and a right knee protector P14R that are provided to left and right knee portions reduce impacts.

If the humanoid robot 1 fell leftward, a left shoulder protector P11L, a left elbow protector P12L and a left foot protector P15L reduce impacts. In addition, depending on the position of the arm, there is a risk that the left arm 12L is sandwiched between the body portion 11 and the ground, and is damaged. So, by providing a left waist protector P13L, it is possible to prevent the body portion 11 and the left arm 12L from directly contacting each other, and impacts can be reduced.

Similarly, if the humanoid robot 1 fell rightward, a right shoulder protector P11R, a right elbow protector P12R and a right foot protector P15R reduce impacts. In addition, depending on the position of the arm, there is a risk that the right arm 12R is sandwiched between the body portion 11 and the ground, and is damaged. So, by providing a right waist protector P13R, it is possible to prevent the body portion 11 and the right arm 12R from directly contacting each other, and impacts can be reduced.

As shown in FIG. 7, if the humanoid robot 1 fell backward, the left hanger ring 103L and right hanger ring 103R reduce impacts caused by contact with the ground. In addition, also by the left slide pad 105L and right slide pad 105R contacting the ground, it is possible to prevent a cover surface of the humanoid robot 1 from contacting the ground and prevent damages or scratches of the cover surface. These protectors are formed of a material that can reduce impacts such as rubber, for example, and can reduce impacts without damages or significant performance deterioration even if the humanoid robot 1 receives multiple impacts.

In addition, because it is configured such that any protectors function as vertexes, and the cover surface of the humanoid robot 1 never protrudes outward from planes formed by linking the individual vertexes, even if the humanoid robot 1 fell in an oblique direction, it is possible to prevent damages, scratches or the like of the cover surface caused by contact with the ground, and to preserve its aesthetic look.

Figure 8:
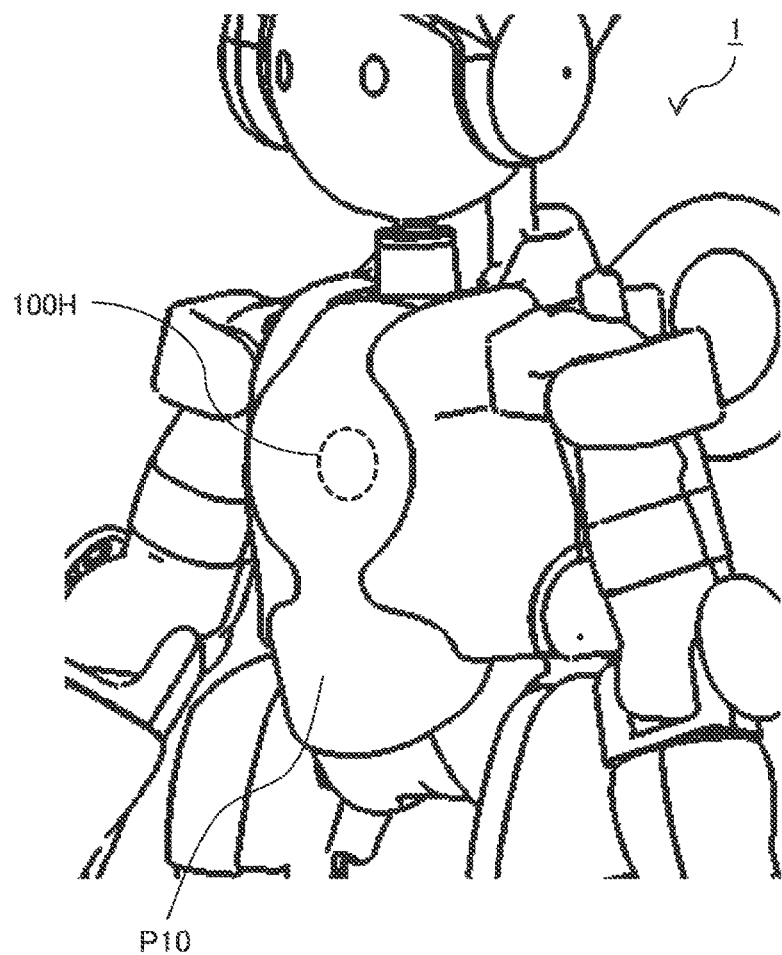
FIG. 8 is a perspective view showing a mounting position of an internal state indication LED of the humanoid robot of Embodiment 1.

FIG. 8 is a perspective view showing a mounting position of an internal state indication LED of the humanoid robot 1. As the protectors formed for example of rubber or the like relatively easily transmit light from LEDs or the like, the internal state of the humanoid robot 1 can be visually checked or grasped from the outside by mounting an internal state indication LED 100H on the back side of a protector and changing its light emission timing, luminescent color or the like.

In addition, as the internal state indication LED 100H is installed at the back side of the protector, the risk of damages due to contact is low. In addition, by showing with a light emission pattern of the internal state indication LED 100H that movement of the humanoid robot 1 is normal when the humanoid robot 1 returns to the upright position from a fallen state as mentioned below, people around the humanoid robot 1 who might be anxious about malfunctioning of it due to falling can be informed of that the humanoid robot 1 is not malfunctioning, and can be given a sense of security. Although in FIG. 8 an example where the internal state indication LED 100H is arranged on the back side of the body protector P10, this is not necessarily the sole example, and it may be configured such that the internal state indication LED 100H is arranged at the back side of another protector.

Figure 9:
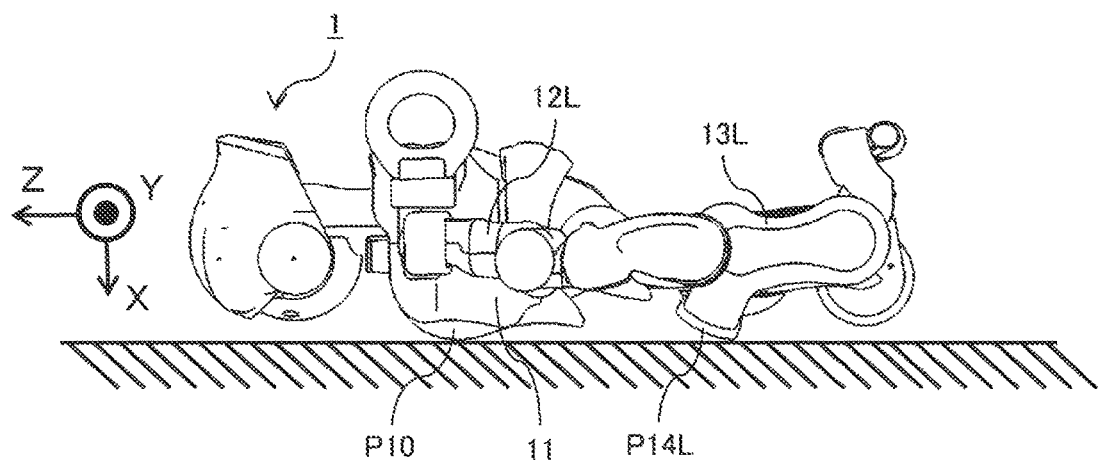
FIG. 9 is a side view showing that the humanoid robot of Embodiment 1 is lying face-down.
Figure 13:
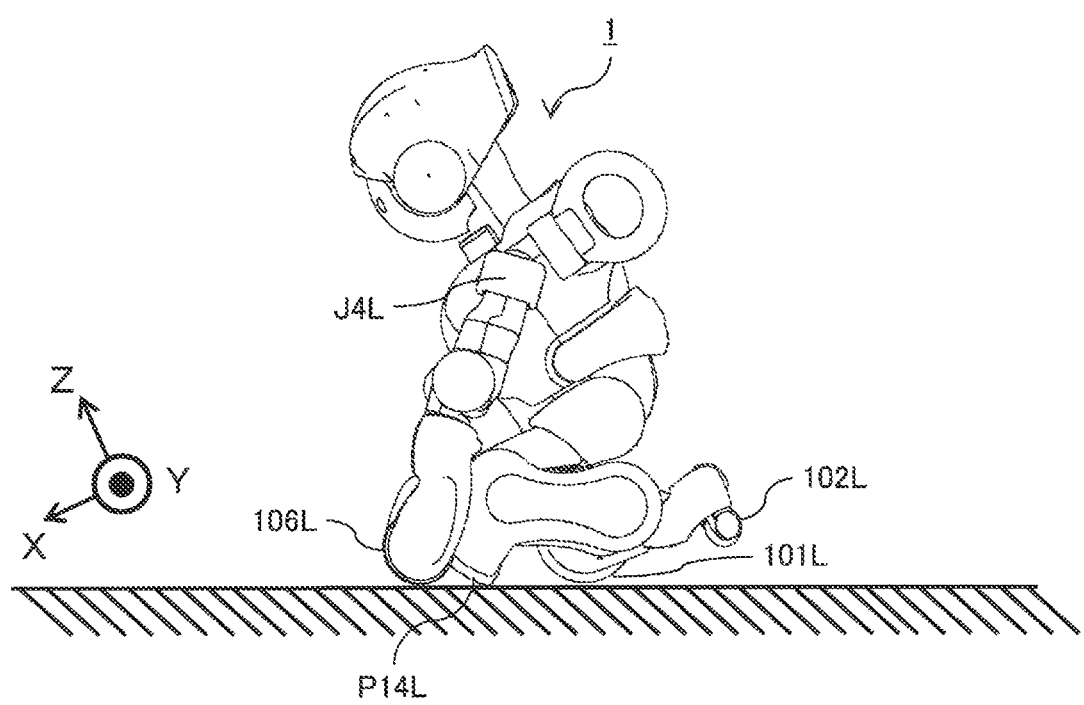
FIG. 13 is a side view showing an intermediate step taken as the humanoid robot of Embodiment 1 transitions from the state where it is lying face-down to the upright position.
Figure 14:
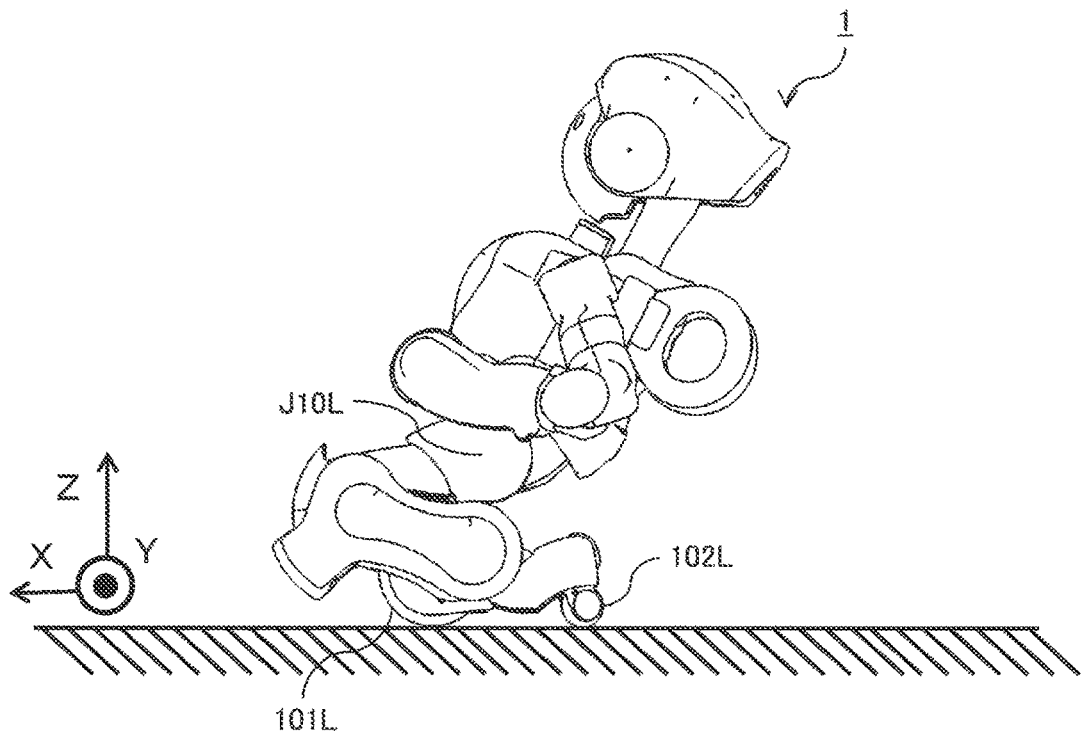
FIG. 14 is a side view showing an intermediate step taken as the humanoid robot of Embodiment 1 transitions from the state where it is lying face-down to the upright position.
Figure 15:
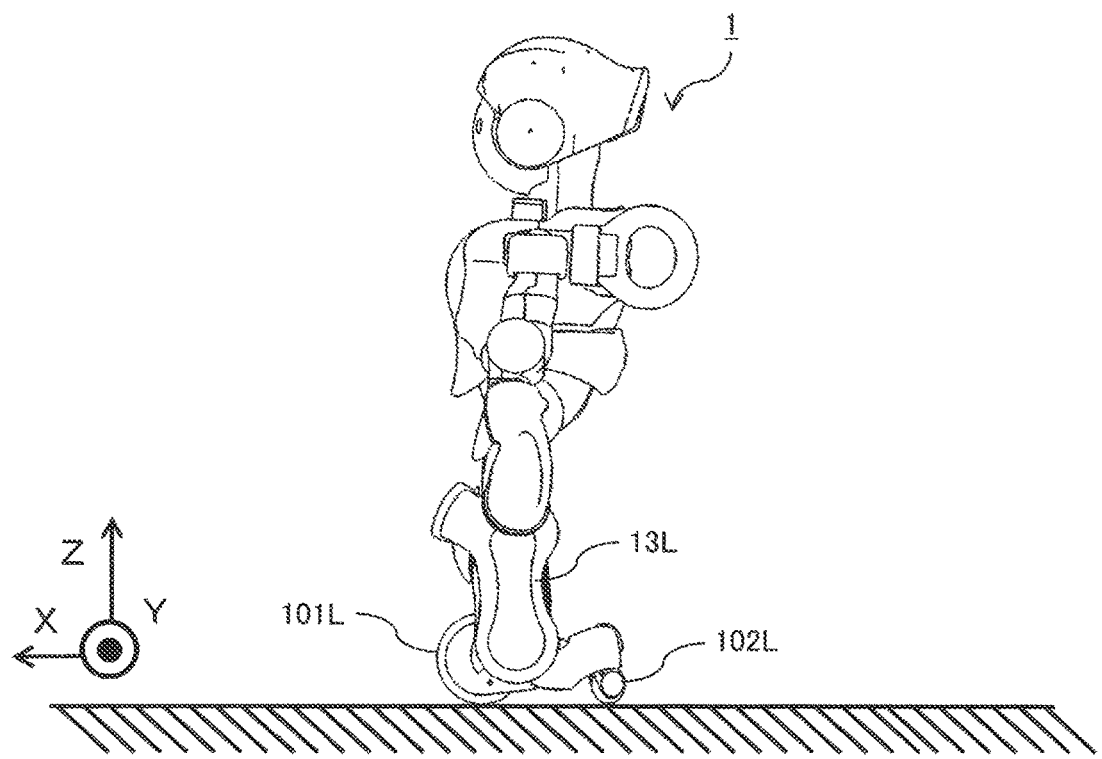
FIG. 15 is a side view showing a state where the humanoid robot of Embodiment 1 has returned to the upright position from the state where it is lying face-down.

FIG. 9 is a side view showing that the humanoid robot 1 is lying face-down, FIG. 10 to FIG. 14 are side views showing intermediate steps taken as the humanoid robot 1 transitions from the state where it is lying face-down to the upright position, and FIG. 15 is a side view showing a state where the humanoid robot 1 has returned to the upright position from the state where it is lying face-down. In the order of FIG. 9 to FIG. 15, the humanoid robot 1 transitions from the state where it is lying face-down to the upright position. As the movement of returning to the upright position is performed in a left-right symmetrical manner, in FIG. 9 to FIG. 15, the side views of only the left side of the humanoid robot 1 are shown.

As shown in FIG. 9, if a sensor to perform position measurement mounted in the body portion 11 of the humanoid robot 1 detects an inclination to the direction of gravity with a predetermined angle or larger, the control unit (not illustrated) mounted in the body portion 11 drives each axis shown in the abovementioned FIG. 3 such that the left arm 12L and right arm 12R are respectively extended toward the foot direction, and the neck, waist, left foot 13L and right foot 13R are also extended. Accordingly, immediately after falling face-down, the humanoid robot 1 contacts the ground only at the body protector P10, left knee protector P14L and right knee protector P14R.

Figure 10:
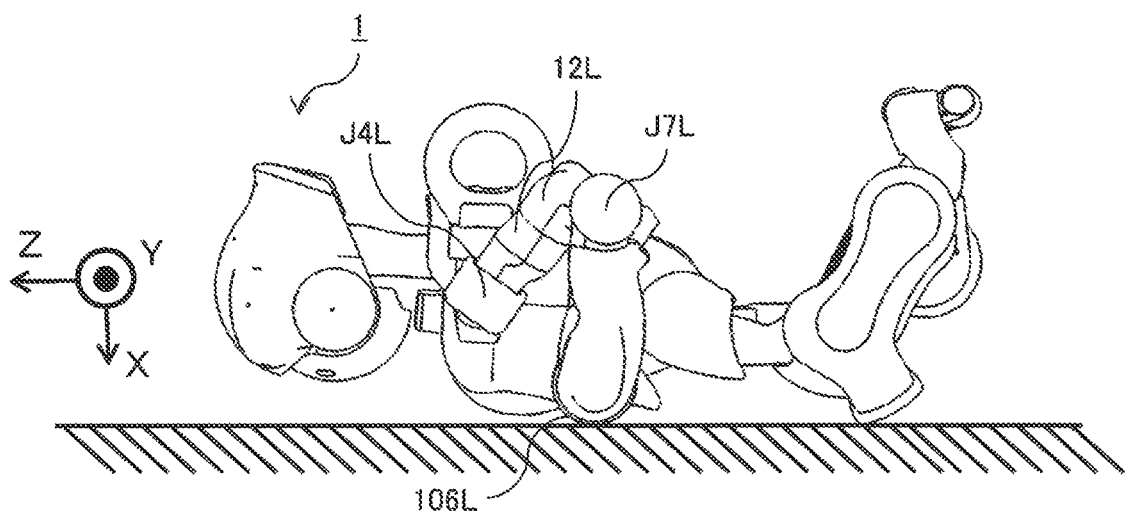
FIG. 10 is a side view showing an intermediate step taken as the humanoid robot of Embodiment 1 transitions from the state where it is lying face-down to the upright position.

Next, the position of the humanoid robot 1 transitions to the position shown in FIG. 10. The control unit (not illustrated) mounted in the body portion 11 drives the left shoulder pitch axis J4L, right shoulder pitch axis J4R, left elbow pitch axis J7L and right elbow pitch axis J7R by predetermined angles, and bring the left hand-end wheel 106L and right hand-end wheel 106R into contact with the ground. In addition, the control unit (not illustrated) appropriately drives the respective axes of the left arm 12L and right arm 12R such that the orientation of the rotation axes of the left hand-end wheel 106L and right hand-end wheel 106R become parallel with the Y-axis.

Figure 11:
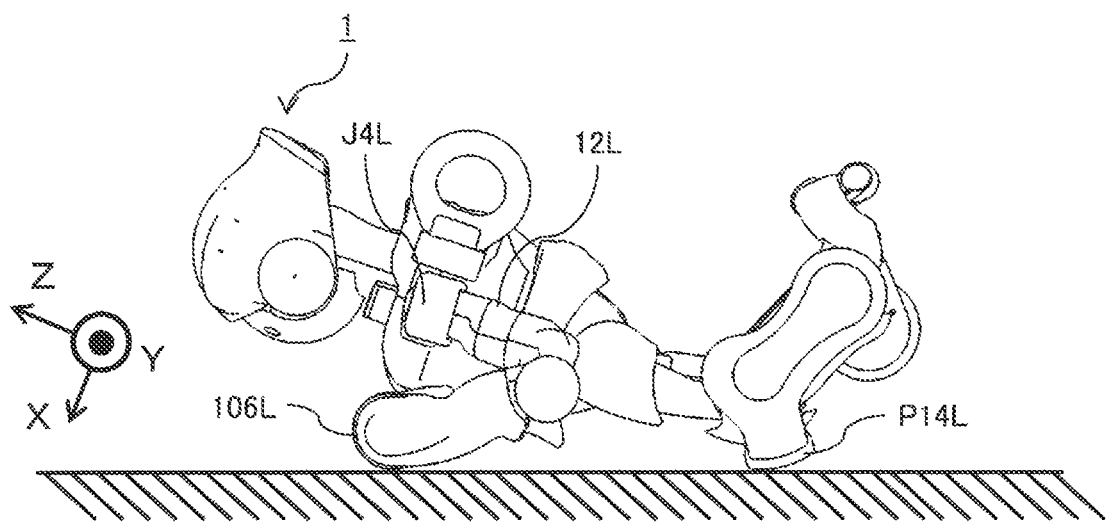
FIG. 11 is a side view showing an intermediate step taken as the humanoid robot of Embodiment 1 transitions from the state where it is lying face-down to the upright position.

Next, as shown in FIG. 11, the control unit (not illustrated) mounted in the body portion 11 of the humanoid robot 1 drives the left shoulder pitch axis J4L and right shoulder pitch axis J4R, and the position of the humanoid robot 1 transitions to a position in which the left hand-end wheel 106L, right hand-end wheel 106R, left knee protector P14L and right knee protector P14R contact the ground.

Figure 12:
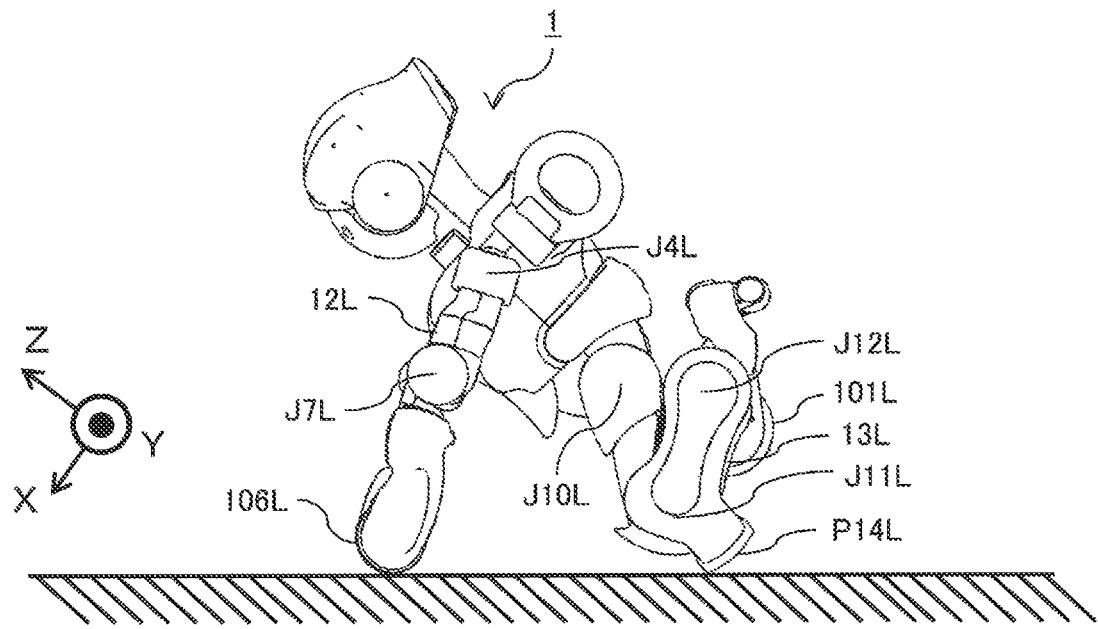
FIG. 12 is a side view showing an intermediate step taken as the humanoid robot of Embodiment 1 transitions from the state where it is lying face-down to the upright position.

Next, as shown in FIG. 12, the control unit (not illustrated) mounted in the body portion 11 of the humanoid robot 1 drives the left shoulder pitch axis J4L, right shoulder pitch axis J4R, left elbow pitch axis J7L and right elbow pitch axis J7R in directions to extend the left arm 12L and right arm 12R. Concurrently, the control unit (not illustrated) mounted in the body portion 11 drives the left hip joint pitch axis J10L, right hip joint pitch axis J10R, left knee pitch axis J11L, right knee pitch axis J11R, left ankle pitch axis J12L and right ankle pitch axis J12R in directions to shorten the left foot 13L and right foot 13R. In this position, the left hand-end wheel 106L, right hand-end wheel 106R, left knee protector P14L and right knee protector P14R contact the ground.

Next, as shown in FIG. 13, the control unit (not illustrated) mounted in the body portion 11 of the humanoid robot 1 drives the left shoulder pitch axis J4L and right shoulder pitch axis J4R, respectively, in a direction to bring ground-contacting points of the left hand-end wheel 106L and left knee protector P14L closer and in a direction to bring ground-contacting points of the right hand-end wheel 106R and right knee protector P14R closer. About the ground-contacting points of the left knee protector P14L and right knee protector P14R, the entire humanoid robot 1 rotates clockwise in FIG. 13, and this movement is performed until the left drive wheel 101L and right drive wheel 101R contact the ground.

Next, as shown in FIG. 14, the control unit (not illustrated) mounted in the body portion 11 of the humanoid robot 1 drives the left hip joint pitch axis J10L and right hip joint pitch axis J10R such that the entire humanoid robot 1 rotates clockwise in FIG. 14 about the ground-contacting points of the left drive wheel 101L and right drive wheel 101R so that the left follower wheel 102L and right follower wheel 102R contact the ground. At this time, the position of the left arm 12L may be changed supplementarily. After only the left drive wheel 101L, right drive wheel 101R, left follower wheel 102L and right follower wheel 102R have come into contact with the ground, the control unit (not illustrated) mounted in the body portion 11 of the humanoid robot 1 drives the respective joint axes shown in the abovementioned FIG. 3 of the left foot 13L and right foot 13R by predetermined angles, and the humanoid robot 1 transitions to the upright position as shown in FIG. 15. Thereby, the humanoid robot 1 completes returning to the upright position from the state where it is lying face-down.

Note that as the face-down position (the state where it is lying face-down) is a stable position with no risk of falling, the humanoid robot 1 desirably assumes this position urgently and evasively if the battery level is low. In view of this, if the battery level lowers to the extent the humanoid robot 1 becomes unmovable, according to commands from the control unit (not illustrated) mounted in the body portion 11 of the humanoid robot 1, the sequence to rise up from the face-down position shown in the abovementioned FIG. 9 to FIG. 15 is executed in the reverse order, and a transition to the state where it is lying face-down is made; thereby, it is possible to make a transition to the energy-save mode or to turn off the humanoid robot 1.

Figure 16:
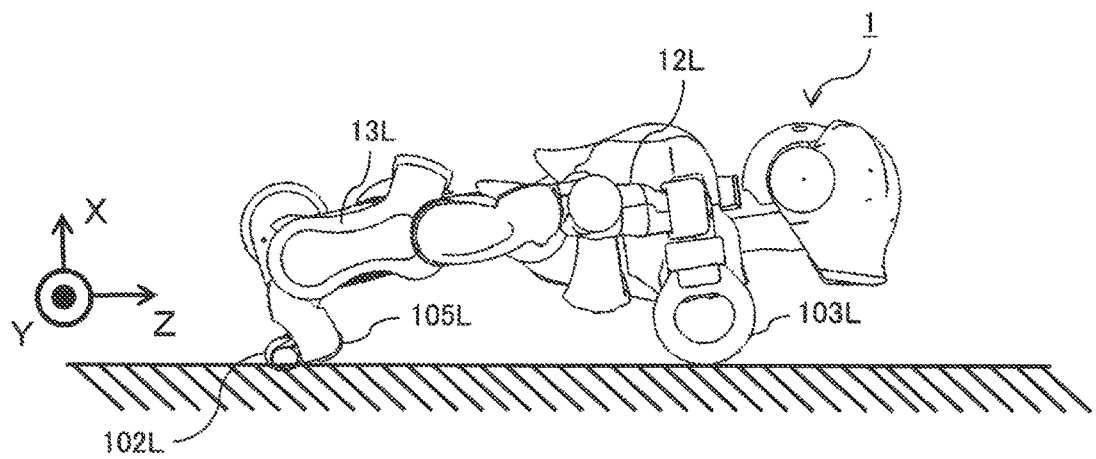
FIG. 16 is a side view showing that the humanoid robot of Embodiment 1 is lying face-up.
Figure 20:
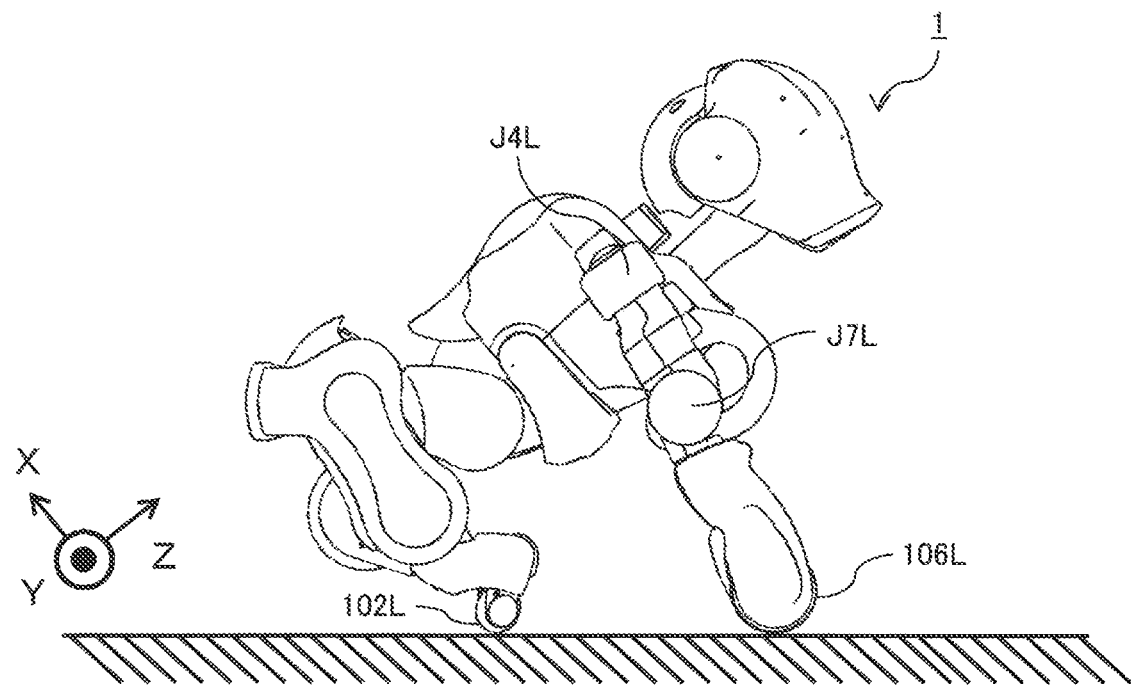
FIG. 20 is a side view showing an intermediate step taken as the humanoid robot of Embodiment 1 transitions from the state where it is lying face-up to the upright position.
Figure 21:
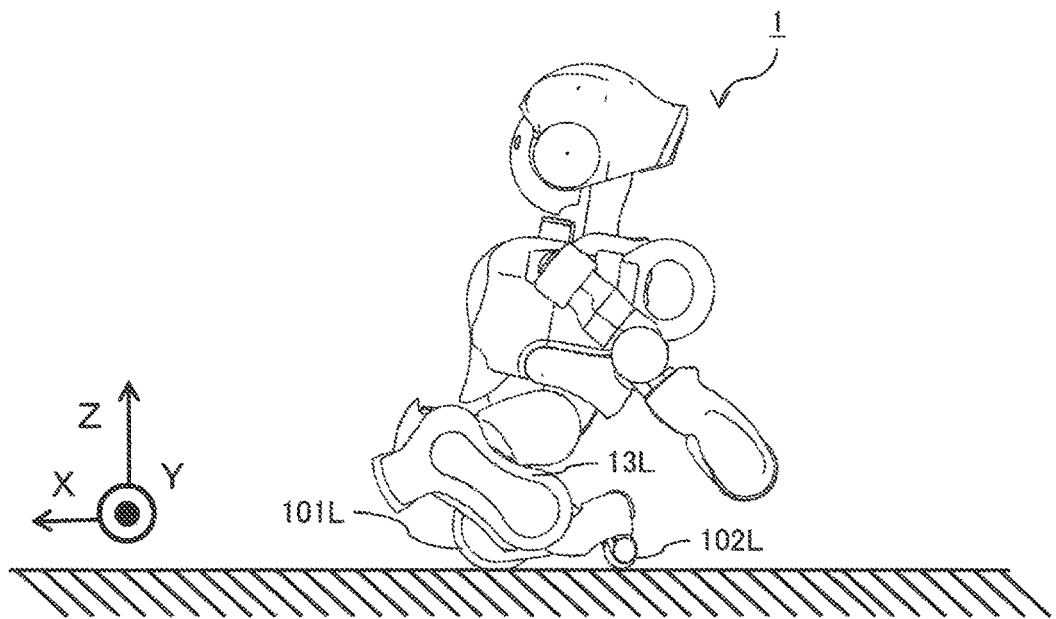
FIG. 21 is a side view showing an intermediate step taken as the humanoid robot of Embodiment 1 transitions from the state where it is lying face-up to the upright position.
Figure 22:
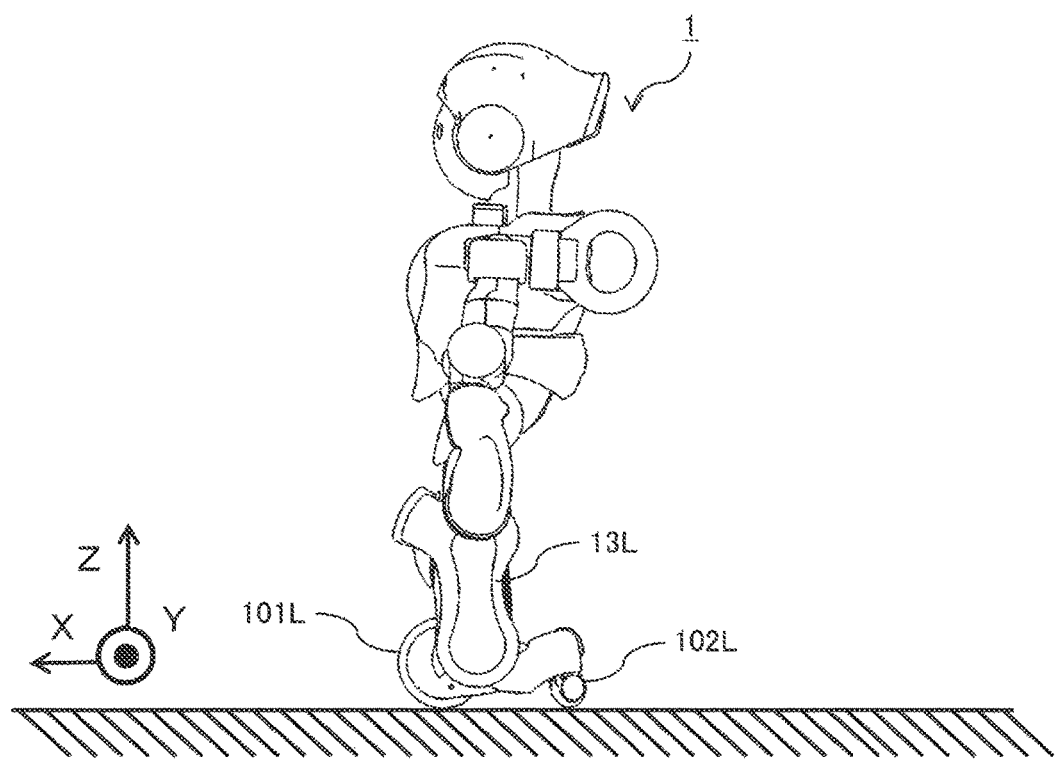
FIG. 22 is a side view showing a state where the humanoid robot of Embodiment 1 has returned to the upright position from the state where it is lying face-up.

FIG. 16 is a side view showing that the humanoid robot 1 is lying face-up, FIG. 17 to FIG. 21 are side views showing intermediate steps taken as the humanoid robot 1 transitions from the state where it is lying face-up to the upright position, and FIG. 22 is a side view showing a state where the humanoid robot 1 has returned to the upright position from the state where it is lying face-up. In the order of FIG. 16 to FIG. 22, the humanoid robot 1 transitions from the state where it is lying face-up to the upright position. In this case as well, as the movement of returning to the upright position is performed in a left-right symmetrical manner, in FIG. 16 to FIG. 22, the side views of only the left side of the humanoid robot 1 are shown.

As shown in FIG. 16, if a sensor to perform position measurement mounted in the body portion 11 of the humanoid robot 1 detects an inclination to the direction of gravity with a predetermined angle or larger, the control unit (not illustrated) mounted in the body portion 11 drives each axis shown in the abovementioned FIG. 3 such that the left arm 12L and right arm 12R are extended toward the foot direction, and the neck, waist, left foot 13L and right foot 13R are also extended. Accordingly, immediately after falling face-up, the humanoid robot 1 contacts the ground only at the left hanger ring 103L, right hanger ring 103R, left slide pad 105L, right slide pad 105R, left follower wheel 102L and right follower wheel 102R.

Figure 17:
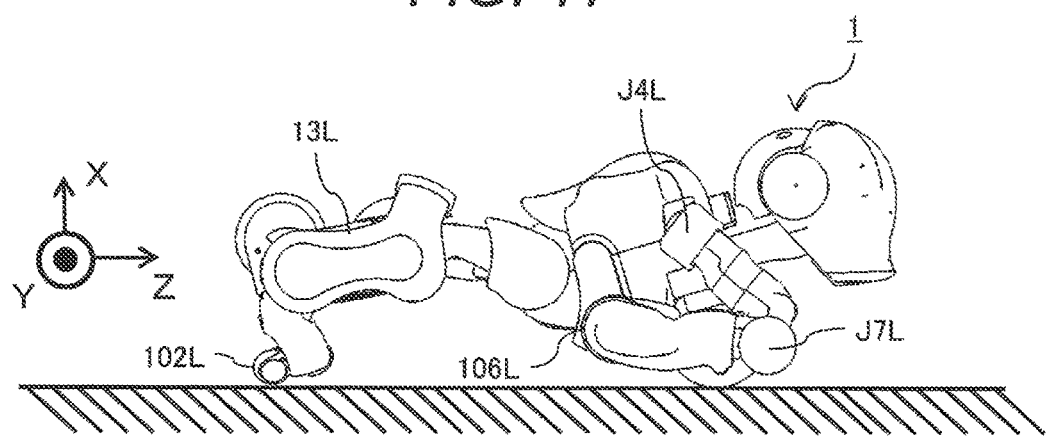
FIG. 17 is a side view showing an intermediate step taken as the humanoid robot of Embodiment 1 transitions from the state where it is lying face-up to the upright position.

Next, as shown in FIG. 17, the control unit (not illustrated) mounted in the body portion 11 of the humanoid robot 1 drives the left shoulder pitch axis J4L, right shoulder pitch axis J4R, left elbow pitch axis J7L and right elbow pitch axis J7R by predetermined angles, and transitions to a preparatory position for bringing the left hand-end wheel 106L and right hand-end wheel 106R into contact with the ground.

Figure 18:
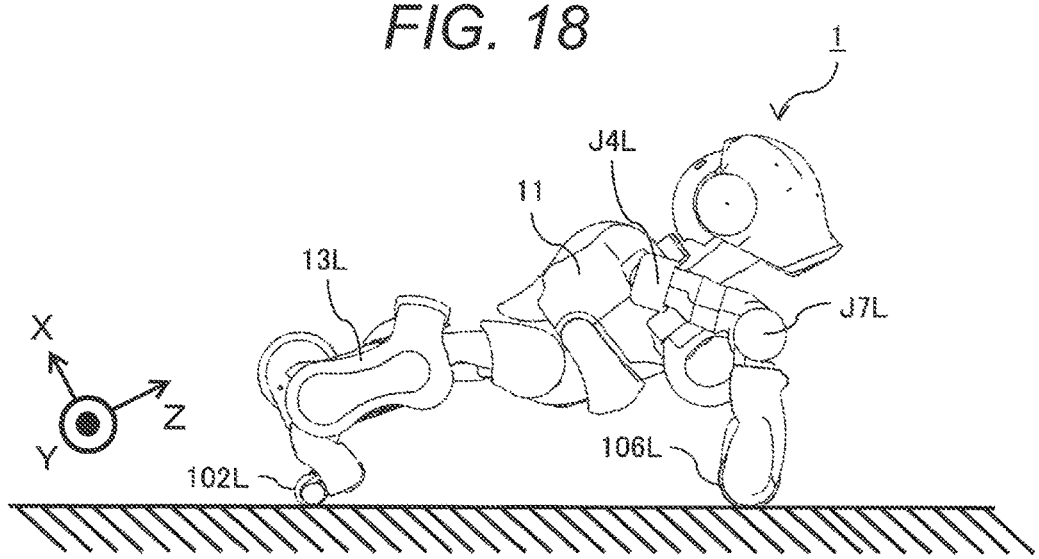
FIG. 18 is a side view showing an intermediate step taken as the humanoid robot of Embodiment 1 transitions from the state where it is lying face-up to the upright position.

Next, as shown in FIG. 18, the control unit (not illustrated) mounted in the body portion 11 of the humanoid robot 1 drives the left shoulder pitch axis J4L, right shoulder pitch axis J4R, left elbow pitch axis J7L and right elbow pitch axis J7R in a manner to push the ground with the left hand-end wheel 106L and right hand-end wheel 106R, and raises the body portion 11.

Figure 19:
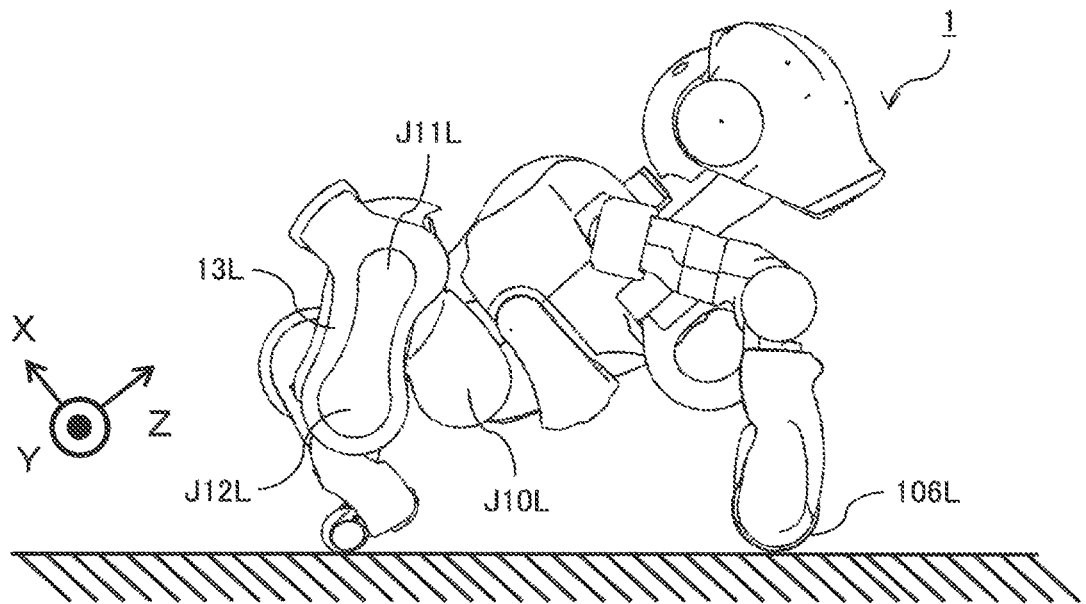
FIG. 19 is a side view showing an intermediate step taken as the humanoid robot of Embodiment 1 transitions from the state where it is lying face-up to the upright position.

Next, as shown in FIG. 19, the control unit (not illustrated) mounted in the body portion 11 of the humanoid robot 1 drives the left hip joint pitch axis J10L, right hip joint pitch axis J10R, left knee pitch axis J11L, right knee pitch axis J11R, left ankle pitch axis J12L and right ankle pitch axis J12R in directions to shorten the left foot 13L and right foot 13R. Next, as shown in FIG. 20, the control unit (not illustrated) mounted in the body portion 11 of the humanoid robot 1 drives the left shoulder pitch axis J4L, right shoulder pitch axis J4R, left elbow pitch axis J7L and right elbow pitch axis J7R in a manner to push the ground with the left hand-end wheel 106L and right hand-end wheel 106R, and rotates the entire humanoid robot 1 counterclockwise in FIG. 20 about the left follower wheel 102L and right follower wheel 102R. As shown in FIG. 21, after the entire humanoid robot 1 is rotated, only the left drive wheel 101L, right drive wheel 101R, left follower wheel 102L and right follower wheel 102R contact the ground. Thereafter, the control unit (not illustrated) mounted in the body portion 11 of the humanoid robot 1 drives the respective joint axes shown in the abovementioned FIG. 3 of the left foot 13L and right foot 13R by predetermined angles, and the humanoid robot 1 transitions to the upright position as shown in FIG. 22. Thereby, the humanoid robot 1 completes returning to the upright position from the state where it is lying face-up.

Figure 23:
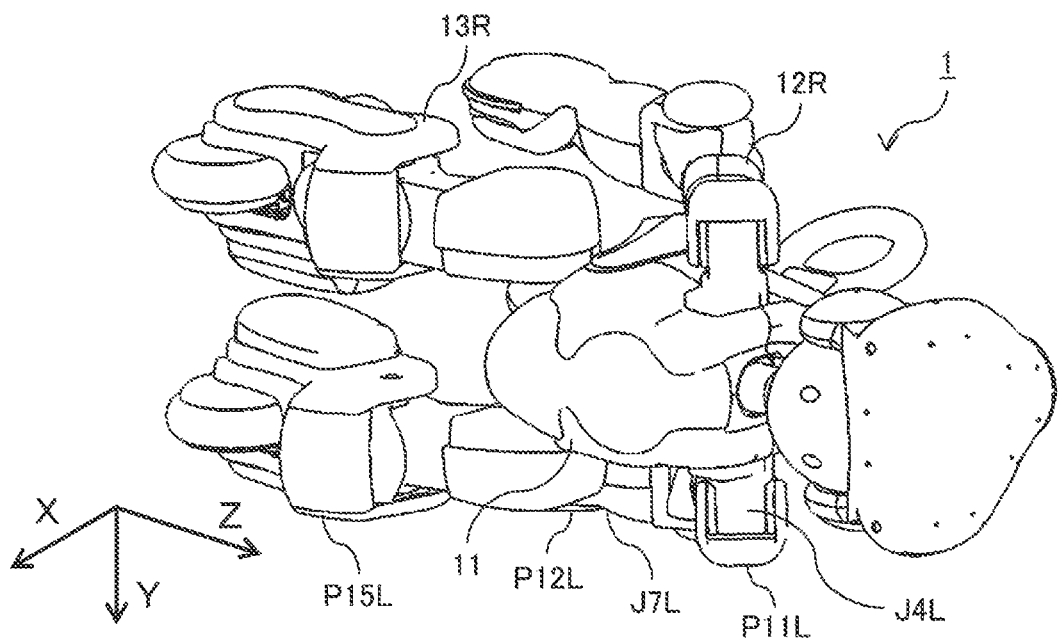
FIG. 23 is a perspective view showing that the humanoid robot of Embodiment 1 fell sideways.
Figure 24:
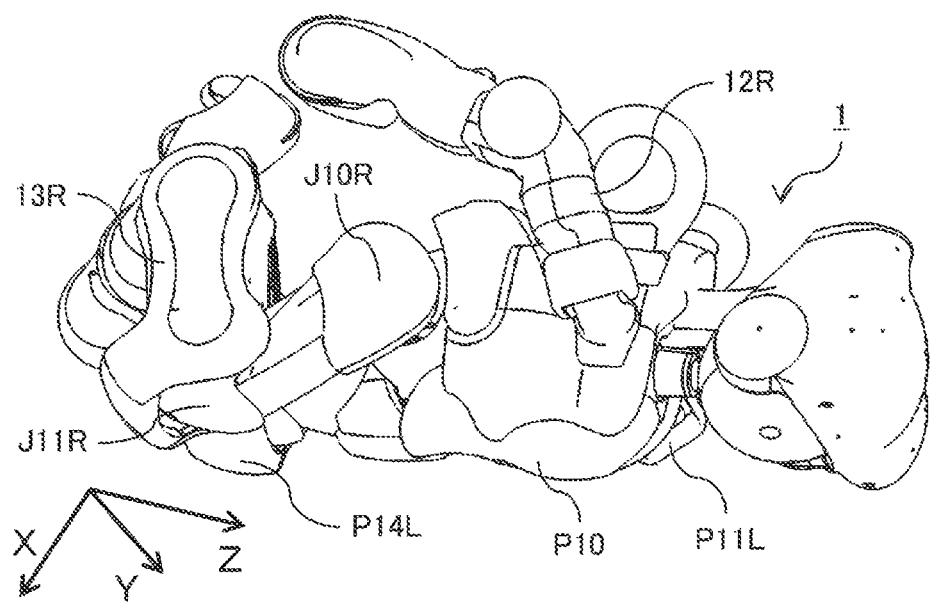
FIG. 24 is a perspective view of an intermediate step taken as the humanoid robot of Embodiment 1 transitions from the state where it fell sideways to a state where it is lying face-down.
Figure 25:
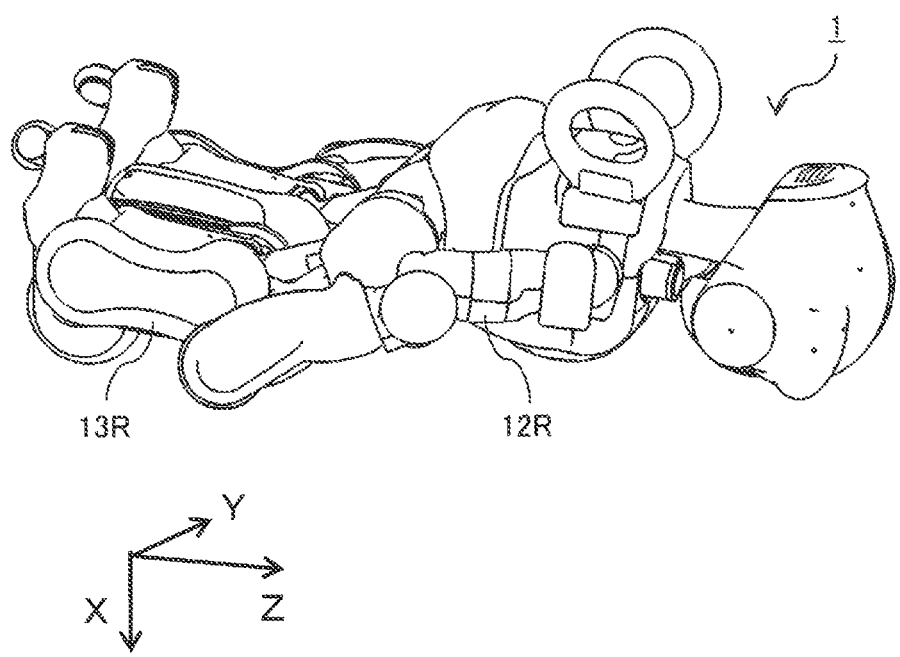
FIG. 25 is a perspective view showing a state where the humanoid robot of Embodiment 1 has transitioned from the state where it fell sideways to the state where it is lying face-down.

FIG. 23 is a perspective view showing that the humanoid robot 1 fell sideways, FIG. 24 is a perspective view of an intermediate step taken as the humanoid robot 1 transitions from the state where it fell sideways to a state where it is lying face-down, and FIG. 25 is a perspective view showing a state where the humanoid robot 1 has transitioned from the state where it fell sideways to the state where it is lying face-down. In order for the humanoid robot 1 to transition from the state to the upright position where it fell sideways, it once goes through the face-down position. That is, it assumes the state where it is lying face-down from the sideways fallen position in the order shown in FIG. 23 to FIG. 25, and transitions to the upright position in the order shown in FIG. 9 to FIG. 15. As movement to be performed if the humanoid robot 1 falls with its left side facing downward, and movement to be performed when it falls with its right side facing downward are left-right symmetrical, only the movement to be performed if it falls with its left side facing downward is explained here.

As shown in FIG. 23, if a sensor to perform position measurement mounted in the body portion 11 of the humanoid robot 1 detects an inclination to the direction of gravity with a predetermined angle or larger, the control unit (not illustrated) mounted in the body portion 11 drives each axis shown in the abovementioned FIG. 3 such that the left arm 12L and right arm 12R are respectively extended toward the foot direction, and the neck, waist, left foot 13L and right foot 13R are also extended. Then, the control unit (not illustrated) mounted in the body portion 11 drives the left shoulder pitch axis J4L and left elbow pitch axis J7L to thereby pull the left arm 12L backward so as to avoid becoming unmovable with its left arm 12L sandwiched between the body portion 11 and the ground. Accordingly, immediately after falling sideways with its left side facing downward, the humanoid robot 1 contacts the ground at the left foot protector P15L, left shoulder protector Pin and left elbow protector P12L.

Next, as shown in FIG. 24, the control unit (not illustrated) mounted in the trunk portion 11 of the humanoid robot 1 drives the right hip joint pitch axis J10R and right knee pitch axis J11R in a direction to bring the right knee to the front of the machine body of the humanoid robot 1. As the centroid shifts to the front of the machine body (X-direction) thereby, the machine body rotates about the Z-axis. At this time, the left shoulder protector P11L, body protector P10 and left knee protector P14L contact the ground (grounded). Thereafter, the control unit (not illustrated) mounted in the body portion 11 of the humanoid robot 1 makes the angle of each axis shown in the abovementioned FIG. 3 an angle similar to that shown in FIG. 23 again. Thereby, the humanoid robot 1 transitions to the state where it is lying face-down as shown in FIG. 25. In this manner, the humanoid robot 1 completes a transition from the state where it fell sideways to the state where it is lying face-down. In a case where the humanoid robot 1 falls with its right side facing downward as well, similar movement is performed with left and right reversed, and it transitions to the state where it is lying face-down. Thereafter, as shown in FIG. 9 to FIG. 15, the humanoid robot 1 returns to the upright position from the state where it is lying face-down.

In this manner, even if the humanoid robot 1 assumes any of the state where it is lying face-down, the state where it is lying face-up and the state where it fell sideways at the time of falling, it can return to the upright position, and can continue its operation. In addition, even if the humanoid robot 1 assumes any of the state where it is lying face-down, the state where it is lying face-up and the state where it fell sideways at the time of falling, as it contacts the ground only at any of the protectors, impacts at the time of falling are reduced to thereby be able to prevent performance degradation, to prevent damages or scratches of covers, and to continue its operation.

According to the present embodiment, to solve a problem that if a humanoid robot (human-like robot) with a small footprint that can perform agile operation falls due to unexpected disturbance, performance degradation occurs or damages to the cover surfaces occur and continuation of its operation becomes impossible, it becomes possible to lower the possibility of falling by control of lengths of the left follower wheel 102L, right follower wheel 102R, left foot 13L and right foot 13R. In addition, even if the humanoid robot falls, impacts are reduced by protectors of individual units, and the left hanger ring 103L and right hanger ring 103R to thereby be able to suppress performance degradation, damages, scratches or the like of the cover surfaces are prevented to thereby be able to preserve their aesthetic look, and the humanoid robot returns to the upright position by driving each axis to thereby able to continue its operation; therefore, the humanoid robot with high operation continuation probability can be provided.

Note that the present invention is not limited to the abovementioned embodiment, but it covers various variants. For example, the abovementioned embodiment is explained in detail for explaining the present invention in an easy-to-understand manner, and the present invention is not necessarily limited to the one that are provided with all the explained configurations.

REFERENCE SIGNS LIST

1: humanoid robot; 10: head portion; 11: body portion; 12L: left arm; 12R: right arm; 13L: left foot; 13R: right foot; 14L: left running unit; 14R: right running unit; 100L: left gripper; 100R: right gripper; 101L: left drive wheel; 101R: right drive wheel; 102L: left follower wheel; 102R: right follower wheel; 103L: left hanger ring; 103R: right hanger ring; 104: rear-view camera; 105L: left slide pad; 105R: right slide pad; 106L: left hand-end wheel; 106R: right hand-end wheel; 107: ambient environment measurement sensor; J1: head portion roll axis; J2: head portion pitch axis; J3: head portion yaw axis; J4L: left shoulder pitch axis; J4R: right shoulder pitch axis; J5L: left shoulder roll axis; J5R: right shoulder roll axis; J6L: left upper arm yaw axis; J6R: right upper arm yaw axis; J7L: left elbow pitch axis; J7R: right elbow pitch axis; J8L: left wrist yaw axis; J8R: right wrist yaw axis; J9L: left gripper axis; J9R: right gripper axis; J10L: left hip joint pitch axis; J10R: right hip joint pitch axis; J11L: left knee pitch axis; J11R: right knee pitch axis; J12L: left ankle pitch axis; J12R: right ankle pitch axis; P10: body protector; P11L: left shoulder protector; P11R: right shoulder protector; P12L: left elbow protector; P12R: right elbow protector; P13L: left waist protector; P13R: right waist protector; P14L: left knee protector; P14R: right knee protector; P15L: left foot protector; P15R: right foot protector; 100H: internal state indication LED

The invention claimed is:

1. A humanoid robot comprising:
a body portion;
a head portion provided to an upper portion of the body portion;
a left arm and a right arm that have ends connected to left and right end portions at an upper portion of the body portion;
a left foot and a right foot that have ends connected to left and right end portions at a lower portion of the body portion; and
a left running unit and a right running unit provided to the other ends of the left foot and the right foot,
wherein the left running unit has a left drive wheel on a front side of an advancing direction and a left follower wheel on a rear side in the advancing direction that can passively change an advancing direction,
wherein the right running unit has a right drive wheel on a front side of the advancing direction, and a right follower wheel on a rear side in the advancing direction that can passively change an advancing direction, and
wherein the left drive wheel, the right drive wheel, the left follower wheel, and the right follower wheel travel while being in contact with a ground,
wherein the left foot and the right foot each are provided with at least three pitch degrees of freedom at a hip joint pitch axis, a knee pitch axis, and an ankle pitch axis from the body portion toward the left running unit or right running unit,
wherein according to a direction of revolve-running, the hip joint pitch axis, the knee pitch axis, and the ankle pitch axis are each driven, lengths of the left foot and the right foot in a vertical direction are changed relatively, and a centroid is displaced toward the direction of revolve-running.

2. The humanoid robot according to claim 1,
wherein the left arm and the right arm are each provided with at least two pitch degrees of freedom at a shoulder pitch axis and an elbow pitch axis from the body portion toward a leading end portion side.

3. The humanoid robot according to claim 2,
wherein leading end portions of the left arm and the right arm have a left hand-end wheel and a right hand-end wheel, respectively.

4. The humanoid robot according to claim 1,
wherein the left drive wheel and the left follower wheel are located being offset from each other, and the right drive wheel and the right follower wheel are located being offset from each other.

5. A humanoid robot comprising:
a body portion;
a head portion provided to an upper portion of the body portion;
a left arm and a right arm that have ends connected to left and right end portions at an upper portion of the body portion;
a left foot and a right foot that have ends connected to left and right end portions at a lower portion of the body portion; and
a left running unit and a right running unit provided to other ends of the left foot and the right foot,
a left shoulder protector fit to overhang outward from around a connecting portion at which the one end of the left arm is connected to the body portion;
a right shoulder protector fit to overhang outward from around a connecting portion at which the one end of the right arm is connected to the body portion;
a left elbow protector and a right elbow protector that are fit around intermediate portions of the left arm and the right arm in longitudinal directions, respectively;
a left hanger ring and a right hanger ring that have ring-like forms and provided to left and right portions at an upper portion of a back of the body portion, respectively;
a body protector fit to a front surface portion of the body portion;
a left knee protector and a right knee protector that are fit to protrude forward at around intermediate portions of the left foot and the right foot in longitudinal directions, respectively;
a left foot protector and a right foot protector that are fit to outer sides of the left foot and the right foot, respectively; and
a left waist protector and a right waist protector that are fit to left and right sides of the body portion,
wherein the left running unit has a left drive wheel on a front side of an advancing direction and a left follower wheel on a rear side in the advancing direction that can passively change an advancing direction,
wherein the right running unit has a right drive wheel on a front side of the advancing direction, and a right follower wheel on a rear side in the advancing direction that can passively change an advancing direction,
wherein the left drive wheel, the right drive wheel, the left follower wheel, and the right follower wheel travel while being in contact with a ground,
wherein the left foot and the right foot each are provided with at least three pitch degrees of freedom at a hip joint pitch axis, a knee pitch axis, and an ankle pitch axis from the body portion toward the left running unit or right running unit.

6. The humanoid robot according to claim 5,
wherein the left shoulder protector, the right shoulder protector, the left elbow protector, the right elbow protector, the body protector, the left foot protector, the right foot protector, the left waist protector, the right waist protector, the left hanger ring, and the right hanger ring are constituted by a material that can reduce an impact.

7. The humanoid robot according to claim 6,
wherein a light-emitting body is provided to a back side of at least one protector among the left shoulder protector, the right shoulder protector, the left elbow protector, the right elbow protector, the body protector, the left foot protector, the right foot protector, the left waist protector, and the right waist protector, and
an internal state of the humanoid robot is indicated using a transmission light that is emitted from the light-emitting body and is transmitted through the protector.

8. The humanoid robot according to claim 7,
wherein the light-emitting body changes a light emission timing and/or a luminescent color according to the internal state of the humanoid robot.

\* \* \* \* \*